United States Patent [19]

Betzler et al.

[11] Patent Number: 4,687,342

[45] Date of Patent: Aug. 18, 1987

[54] THERMAL RADIATION MEASURING SYSTEM WITH A RADIATION MEASURING DEVICE AND A SHIELDED REFERENCE DEVICE

[75] Inventors: Peter Betzler, Munich; Karl-Friedrich Mast, Garching, both of Fed. Rep. of Germany

[73] Assignee: Max-Planck-Gesellschaft zur Forderung der Wissenschaften e.V., Fed. Rep. of Germany

[21] Appl. No.: 692,843

[22] Filed: Jan. 18, 1985

[30] Foreign Application Priority Data

Jan. 20, 1984 [DE] Fed. Rep. of Germany ....... 3401946
Mar. 9, 1984 [DE] Fed. Rep. of Germany ....... 3408724

[51] Int. Cl.$^4$ ......................... G01J 5/20; G01K 17/00
[52] U.S. Cl. ...................................... 374/32; 219/553; 250/352; 374/129
[58] Field of Search .................. 374/32, 121, 129, 43, 374/44; 219/553; 136/213, 225; 250/338, 352

[56] References Cited

U.S. PATENT DOCUMENTS

| | | | |
|---|---|---|---|
| 2,986,034 | 5/1961 | Jones | 374/121 |
| 3,229,235 | 1/1965 | Bernath | 374/121 |
| 3,535,523 | 10/1970 | Wunderman et al. | 374/32 |
| 3,693,011 | 9/1972 | De Vaux et al. | 374/121 |
| 3,939,706 | 2/1976 | Pinson | 374/32 |
| 4,001,586 | 1/1977 | Fraioli | 374/121 |
| 4,061,917 | 12/1977 | Goranson et al. | 250/338 |
| 4,063,095 | 12/1977 | Wieder | 250/338 |
| 4,443,650 | 4/1984 | Takagi et al. | 136/225 |

FOREIGN PATENT DOCUMENTS 0061359 1/1967 Fed. Rep. of Germany.
106082 6/1973 Fed. Rep. of Germany.

Primary Examiner—Daniel M. Yasich
Attorney, Agent, or Firm—Remy J. VanOphem

[57] ABSTRACT

A bolometer which is adapted for a wide-band of radiation including soft X-radiation, and in which the sensitivity of the time constant (the heat flow from the absorber layer to the dissipator layer) can be exactly preselected without regard to the wave length of the radiation. The bolometer includes an electrically insulating carrier foil which has mounted thereon an absorber layer on one side thereof and a resistance layer on the opposite side of the foil, the resistance layer being part of a resistance measuring bridge. A thermally conductive layer is placed between the absorber layer and the carrier foil. The thermally conductive layer has portions protruding beyond the absorber layer. A heat dissipator is in thermally conductive contact with the protruding portions of the thermally conductive layer to dissipate the heat of the absorber layer. The laterally protruding portions of the thermally conductive layer in contact with the heat dissipator are shielded against the radiation to be measured.

30 Claims, 15 Drawing Figures

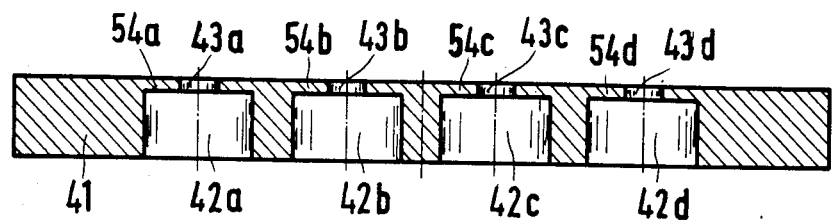
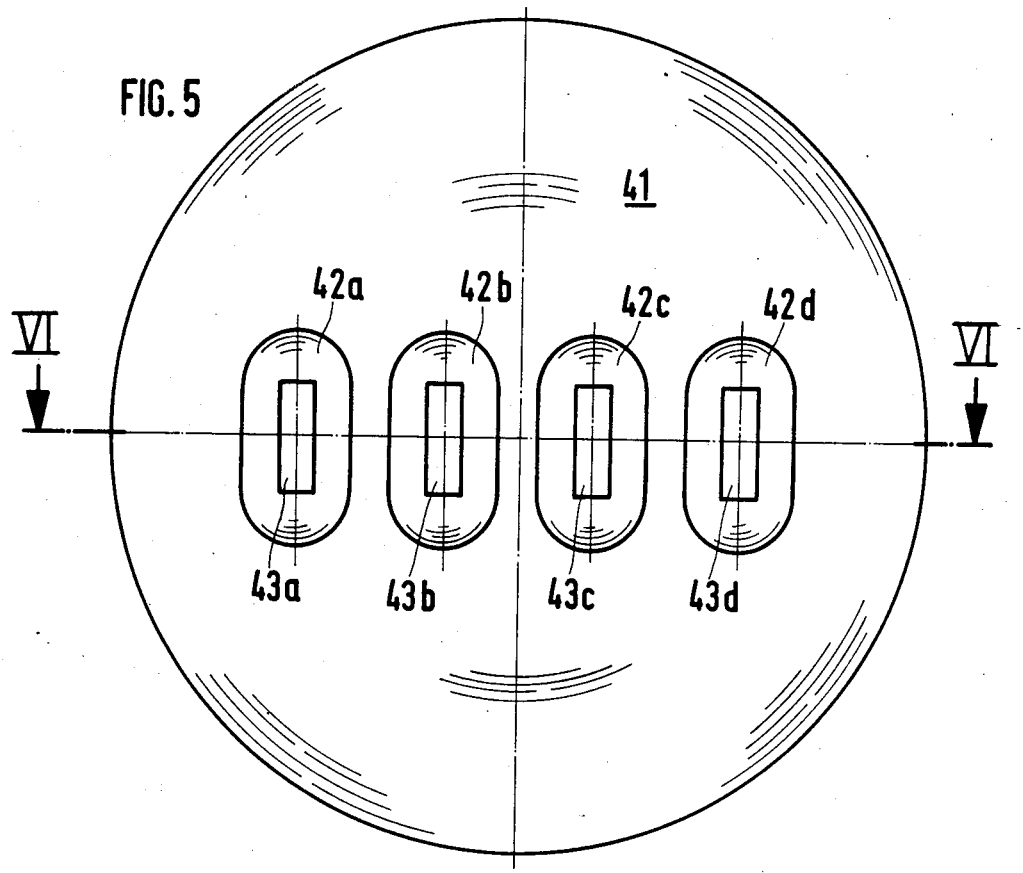

THERMAL RADIATION MEASURING SYSTEM WITH A RADIATION MEASURING DEVICE AND A SHIELDED REFERENCE DEVICE

BACKGROUND OF THE INVENTION

1. Field of the Invention

The present invention relates to a radiation measuring device (bolometer) and also relates to a radiation measuring system designed to use same and consisting of a radiation measuring device exposed to the radiation and a reference measuring device shielded against the radiation.

2. Description of the Prior Art

In the large plasma machines commonly used today, an essential part of the heating capacity deposited in the plasma is transported to the wall of the vacuum vessel by electromagnetic radiation and neutral particles. In order to be able to predict the energy balance of the plasma, it is necessary to measure the radiation power absolutely, resolved as to time and space, over the spectral range in question. The spectral range to be measured extends from the infrared range to the range of soft X-radiation in the 10 keV area.

For wide-band radiation measurement, radiation measuring devices known as bolometers are used. These are radiation detectors which are sensitive to a wide spectral range (infrared to soft X-radiation). They measure the incident radiation power integrally. The mode of operation of the bolometer is based on the absorption of the radiation to be measured and the resulting rise in heat of the bolometer detector. The bolometer signal is proportional to the temperature increase of the detector and the sensitivity depends on the temperature coefficient of the physical effect exploited for measuring the temperature increase.

The following different types of bolometers are used in plasma physics:
(1) the semiconductor bolometer (germanium layer);
(2) the thermistor bolometer (nickel absorber with a thermistor insulated therefrom);
(3) the gold or platinum resistors (freely suspended in a convolute or spiral shape);
(4) the pyroelectric bolometer;
(5) the IR bolometer;
(6) the foil bolometer; and
(7) the Thermopile The radiation power density emitted on the plasma and hitting the detector is of magnitude of a few $mW/cm^2$. The use of foil bolometers is recommended to measure such small radiation power densities in environments, where strong interferences are present caused by neutrons, $\gamma$-radiation and/or electromagnetic signals.

Foil bolometers consist basically of three functionally different elements:
(a) an electrically insulating carrier foil with high mechanical stability, on which
(b) a high-value resistor layer with low heat capacity consisting of thin and narrow strips is arranged in a convoluted shape. On the other side of the foil there is
(c) an absorber layer located precisely over the resistor layer. The absorber layer is in contact on all its edges with a dissipator.

The direct relationship between the time required for the heat to dissipate in the direction of the dissipator and the dimensions of the absorber leads to relatively large configurations of the bolometer detector with the conventional design of foil bolometers. However, detectors with large configurations have the following disadvantages:

(a) screen effects of the geometrical optics, caused by the dimensions of the detector surface with respect to the distance of the detector from the object to be measured and its dimensions;

(b) require relatively high electrical capacity which makes it impossible to use carrier frequency signal transmission;

(c) lack of sensitivity of the signal transmission to low-frequency pick-up. When high-frequency heating is used for the plasma experiment, high pick-up must be expected for the bolometer measurements; and (d) when a large number of such measuring devices are used large rooms are necessary to accommodate the measuring devices even in the case of very average space resolution.

SUMMARY OF THE INVENTION

Assuming a radiation measuring device having an electrically insulating carrier foil on one side of which there is an absorber layer, to be exposed to the radiation to be measured, opposite which a high-value resistor layer is provided on the other side of the carrier foil, which is part of a resistance measuring bridge, the invention is directed to the problem of developing the radiation measuring device in such a way that it meets the following criteria:
(1) small dimensions of the detector and consequently
   (a) the possibility of higher space resolution;
   (b) improved mechanical solidity;
   (c) negligible screen effects of the geometrical optics;
(2) small electrical capacity;
(3) predetermined time constant;
(4) resistance to gamma and neutron radiation;
(5) use detectors which are thermally independent of each other;
(6) use detectors which are electrically independent of each other;
(7) eliminate thermal and electrical interference;
(8) electrical disruptive strength; and
(9) must be able to be used in a high vacuum up to 300° C.

This problem is solved according to the invention by the following features. The absorber layer passes into a laterally protruding thermally conductive layer which is in thermally conductive contact therewith. The thermally conductive layer is shielded against the radiation to be measured. The absorber layer and, optionally, the thermally conductive layer may be made of a precious metal, preferably gold. It is expedient, in a further embodiment of the invention, for the thermally conductive layer to consist of a layer which protrudes laterally beyond the absorber layer and is much thinner than the absorber layer, optionally of one piece therewith and/or made of the same material.

Due to the inventive solution, energy absorption and thermal conductivity are separated, whereby the dimensions of the detector can be substantially reduced so that, in a further embodiment of the invention, a plurality of thermally conductive surfaces each bearing an absorber layer can be arranged in series spaced side by side.

The high-value resistor layers assigned to the absorber layers can each be connected in a separate resistance measuring bridge. A different way of measuring consists in at least some of the high-value resistor layers assigned to the absorber layers being connected in series and the resistor groups formed in this way connected in a separate resistance measuring bridge. In this way the resistance value of a measuring system can be increased accordingly, thereby increasing the voltage across the bridge diagonal accordingly with the same power applied to the resistors and improving the sensitivity of the measuring system.

In a further embodiment of the invention, the fixed resistor opposite the high-value resistor layer in the measuring bridge is also designed as a high-value resistor layer and arranged together with the high-value resistor layer on the side of the carrier foil facing away from the absorber side, within a boundary corresponding to the boundary of the absorber layer. This measure allows for twice the sensitivity of the measuring bridge. This is due to the fact that this fixed resistor, which is now designed as a high-value resistor layer, is also exposed to changes of temperature, namely to the same ones as the high-value resistor layer is exposed to, which was fonmerly exposed to radiation alone.

When, in a further embodiment of the invention, the thermally conductive layers are connected with each other via a dissipator, the extent of the entire measuring system can be substantially reduced because this prevents mutual influence of the various detectors due to the immediate dissipation of heat into the surroundings by the dissipator.

This is preferably effected by constructing the dissipator as a disk made of a material exhibiting good thermal conductivity, which contacts the thermally conductive layers, has substantially larger dimensions of thickness than those of the absorber and thermally conductive layers, and has in the area of each absorber layer a recess whose lateral limits are spaced from the lateral limits of the absorber layers and whose top surface is provided with a window whose dimensions correspond to those of the absorber layer.

Alternatively, the dissipator may be made of the material of the thermally conductive layers and be of one piece construction. For this purpose, a coating is expediently applied to the carrier foil, the coating has recesses, each with a bottom whose central area forms the absorber layer which passes, via a thin edge area forming the thermally conductive layer, into the material of the coating which forms the complete dissipator. This construction allows for better defined geometrical conditions, especially since the thermally cqnductive layer can be obtained much more simply. It is generally possible to provide the dissipator layer in the area of the thermally conductive layer with an undercut design to form a window limiting the radiation being exposed to only the absorber layer. However, it is more simple, in a further embodiment of the invention, when a masking body provided with windows which guarantee that the radiation only sees the absorber layers, is placed upon the coating of the carrier foil constituting the dissipator.

The distance between the limit of each recess and the limit of each absorber layer is preferably such that the heat transmission between the absorber layer and the high-value resistor layer takes place much more quickly than the heat transmission from the limit of the absorber layer to the dissipator.

For the adjustment of the time constant of the lateral heat dissipation from the absorber layer to the dissipator, it is necessary that the distance between the lateral limit of the absorber layers and the dissipator be matched with the thickness of the thermally conductive layer.

It is particularly advantageous when solderable terminal areas are provided to facilitate assembly on the side of the carrier foil bearing the high-value resistor layers, in an arrangement surrounding the resistor layers.

By additionally connecting a reference measuring device, which should be housed as close to the radiation measuring device as possible, electrical and thermal interference can be directly compensated. By connecting the reference measuring device resistor into the second arm of the Wheatstone bridge circuit, effects acting on both detectors lead to a symmetrical tuning of the bridge arms and thus to compensation which retains the tuning of the bridge. When both detectors have identical properties, the measuring bridge remains ideally tuned.

The construction is selected in such a way that the reference measuring device is identically constructed to the radiation measuring device, and the reference measuring device is disposed in the same housing as the radiation measuring device.

The radiation measuring device and the reference bolometer are preferably arranged one behind the other in the housing.

This results in a particularly advantageous construction of the measuring system because the solderable terminal areas are present twice on the side of the two carrier foils bearing the resistors, and may be series-connected, which results in inner and outer terminal areas.

The outer solderable terminal areas are then connected conductively to the first contact pins in the case of the radiation measuring device, and the inner solderable terminal areas are connected conductively to second contact pins in the case of the reference measuring device, while the outer terminal areas are bored out.

The first contact pins reach freely through these bores and the ends of the first and second contact pins form the common connecting body of the measuring system constituting the measuring bolometer and the reference bolometer.

The radiation measuring device is clamped between two dissipators with the corresponding recesses and is provided with mechanically stable connections.

The dissipators are aluminum disks which cool the detectors down to the housing temperature of the measuring system. The dissipator located on the absorber side is designed in such a way that the thermally conductive surfaces are in contact at their edges with the dissipator placed thereon. This dissipator is provided with notches which in turn each have a window which leaves open only the access to the absorber for exposure to the radiation to be measured.

The radiation measuring device may be mounted flat due to the disk-like design of the dissipator. Recesses in the dissipator which lies against the resistor side may be used to adjust the radiation measuring device optically.

The overall construction is distinguished by particularly simple mountability. It is only necessary to punch the lead-in holes through the radiation measuring and reference measuring devices for clamping screws and the contact pins.

The radiation measuring and reference measuring devices can then be mounted and soldered up, and finally the measuring system can be simply put together.

After assembly all components are only under pressure in the measuring direction. The pressure forces not only hold the construction together but also supply the contact pressure between the terminal areas and their contact pins, and the contact pressure for the contact pins located in the base body.

A ring nut suffices to secure the various elements when they are put together in a housing In a modified embodiment of the measuring system, the radiation measuring device and the reference measuring device are arranged one beside the other on the carrier foil, whereby, of course, only the radiation measuring device is exposed to the radiation while the reference measuring device must be shielded against the radiation to be measured.

A design which may be provided with a single mask without any overlapping of leads is made possible in a further embodiment of the invention, by arranging the measuring system in such a way that the high-value resistor layers of the radiation measuring device and the high-value resistor layers of the reference measuring device are each designed as a convolution, and arranging the convolutes of the high-value resistor layers of the radiation measuring device and the reference measuring device interwoven on the carrier foil and providing on each of the sides facing away from each other of this side-by-side arrangement of the radiation measuring and reference measuring devices, two leads opening into terminal areas. The outer leads wind around the inner leads as well as around the terminal areas of these inner leads, whereby one convolute of one of the bolometers is connected between the two outer leads and the other convolute of this bolometer is connected between the inner leads, while the two convolutes of the other bolometer are each connected between an outer and an inner lead. The term "convolute" is meant of course in its broadest sense and does not include only comb-like formations. Spiral-shaped formations can also be inserted into one another and provisions for connections to the outer ends of the spirals can be made when they are designed as double spirals running in one direction and back in the other. When selecting the convolution, it should be ensured that connections are possible on the plane of the convolution, so that connections which are at an angle to this plane are not required.

The stated arrangement can be provided in a further embodiment of the invention in repeated patterns in a preferably symmetrical arrangement on a carrier foil.

BRIEF DESCRIPTION OF THE DRAWINGS

FIG. 5 is an embodiment of a dissipator element connecting the thermally conductive layers of the carrier foil shown in FIG. 3;

FIG. 6 is a cross-section of the dissipator shown in FIG. 5 along line VI—VI of FIG. 5;

DETAILED DESCRIPTION OF THE PREFERRED EMBODIMENT

Figure 1:
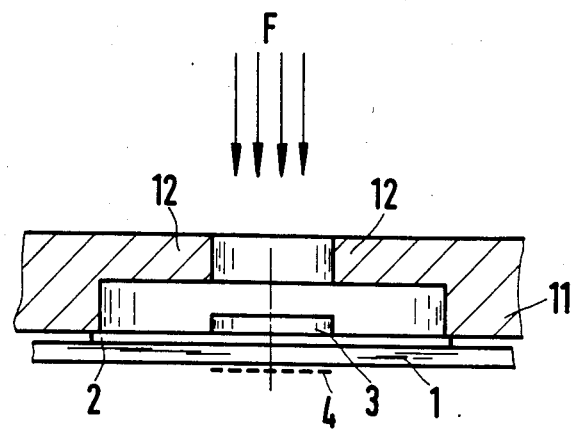
FIG. 1 is a schematic representation of the construction of a foil bolometer according to the invention.

FIG. 1 shows a carrier foil 1 made of an electrically insulating material, for example mica or the synthetic material known by the trademark "Capton." These materials are particularly well-suited due to their high radiation resistance and stability with respect to high temperatures.

Onto the carrier foil 1 a thermally conductive layer 2 is vacuum metallized; gold or platinum is preferred. The thickness of this layer is 0.5 $\mu$m or less.

In the center of this thermally conductive layer 2 an absorber layer 3 made of the same material as the thermally conductive layer 2 is vacuum metallized. This layer has a thickness of 4 $\mu$m. The absorber layer 3 establishes a measuring surface. The thickness of the absorber layer 3 can be selected freely in accordance with the radiation to be measured. The thermally conductive layer 2 and absorber layer 3 may also be of one piece construction.

Opposite the absorber layer 3 on the other side of the carrier foil 1 there is a high-value resistor layer 4 which may have a meander shape, and may be made of vacuum metallized gold or platinum.

Figure 2:
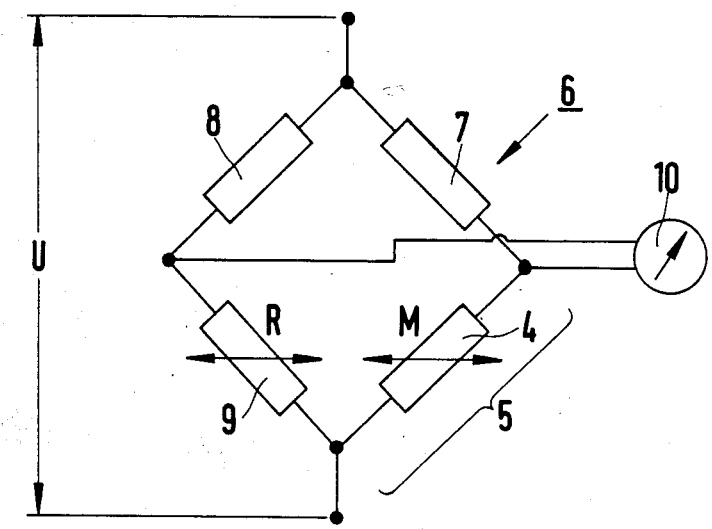
FIG. 2 is a bridge circuit as used for a foil bolometer as that shown in FIG. 1.

A resistor M formed by the resistor layer 4 is located, as shown in FIG. 2, in an arm 5 of a Wheatstone bridge 6, which also has three further resistors 7, 8 and 9, of which the resistor 9 may be a resistor layer R of a reference measuring device. A radiation measuring device 10 is connected across a diagonal of the bridge, while a voltage U is applied to the other diagonal. Touching thermally conductive layer 2 near its edges, a dissipator 11 is placed upon the arrangement. The dissipator has inwardly extending projections 12 which fonm a shield leaving free only the access to the absorber layer 3 which as indicated schematically in FIG. 2 is exposed to radiation F. The carrier foil 1 forms together with the thermally conductive layer 2, the absorber layer 3 and the resistor layer 4, to become the detector of the radiation measuring device, which may also be termed a foil bolometer.

Figure 3:
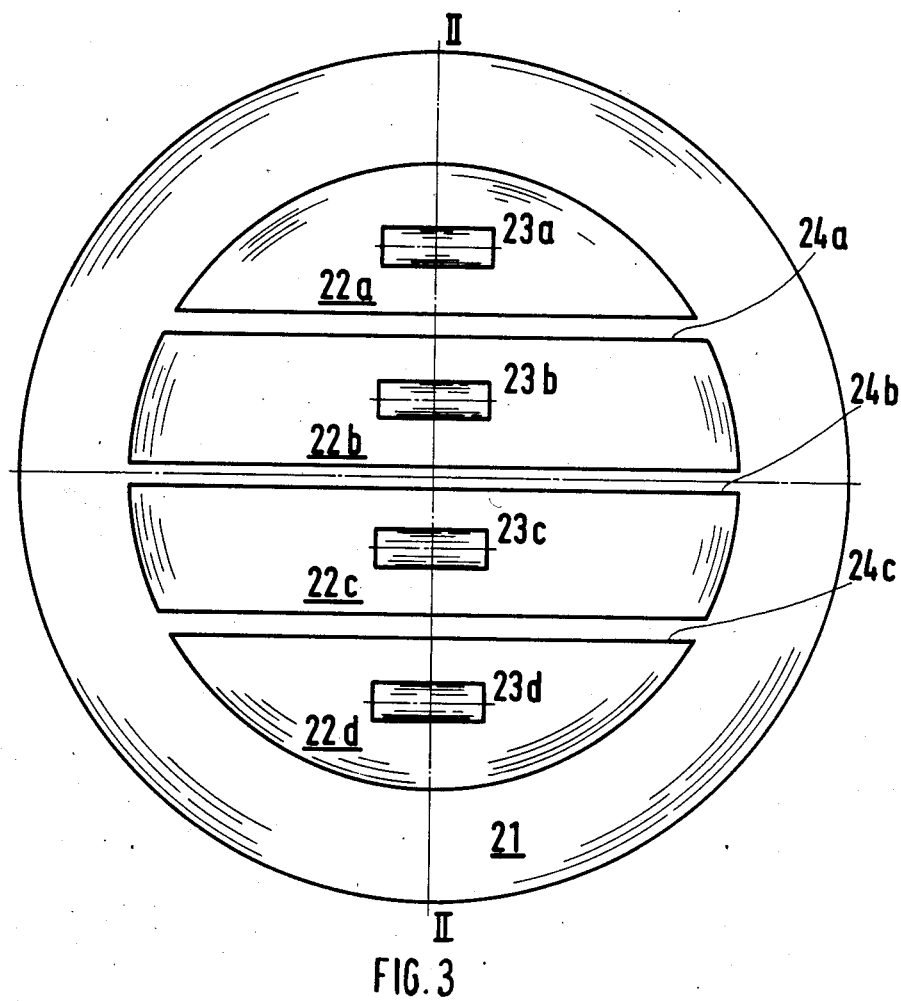
FIG. 3 is a top view of a carrier foil having four absorber layers arranged in series side-by-side with their corresponding thenmally conductive layers according to a preferred embodiment.

FIG. 3 shows an arrangement with four detectors located side by side as seen from the top, without the shielding dissipator, mounted to the carrier foil 21, which is designed to have a circular formation in the present arrangement. Across diameter II—II, four absorber layers 23a, 23b, 23c and 23d, are provided in a row, each placed on thermally conductive layers 22a, 22b, 22c, 22d. These thermally conductive layers are formed in such a way that their outer periphery matches the circular circumference of the carrier foil 21 while maintaining corresponding distances 24a, 24b and 24c.

Figure 4:
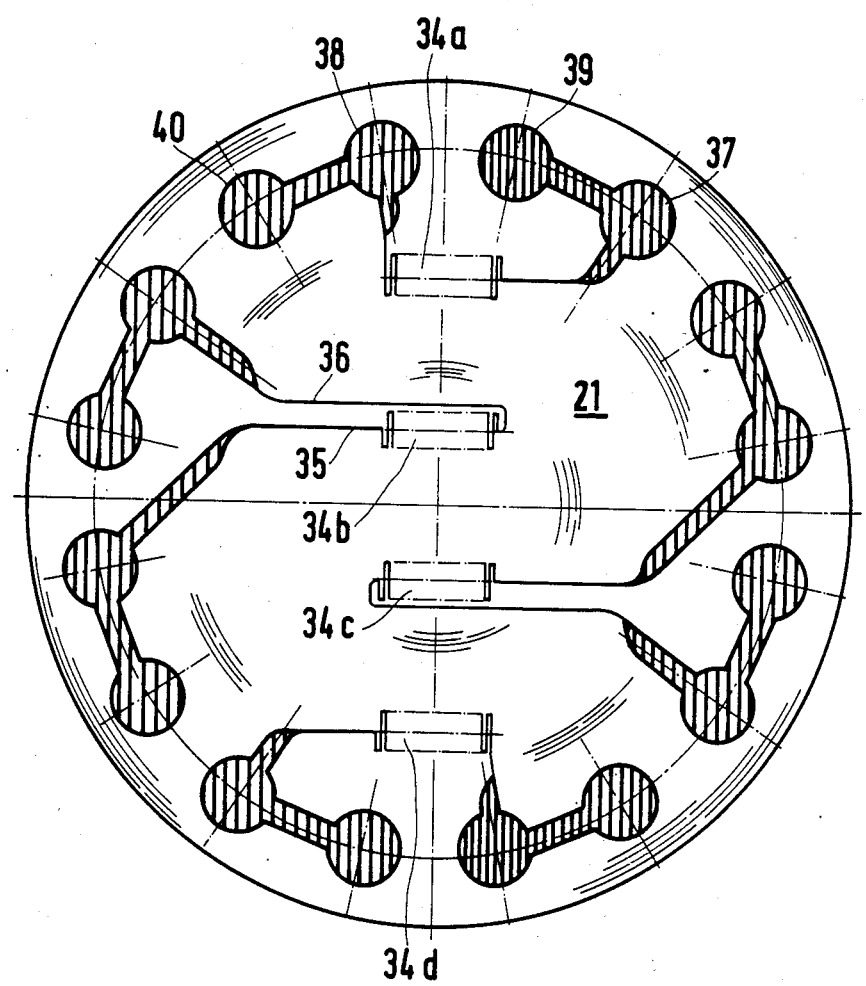
FIG. 4 is a bottom view of the carrier foil shown in FIG. 3.

FIG. 4 shows the bottom view of the carrier foil 21, with high-value resistor layers 34a, 34b, 34c and 34d thereon. They are placed exactly below the absorber layers 23a, 23b, 23c, 23d which are on the other side of the carrier foil 21, so that the absorber layer and the corresponding high-value resistor layer, for example absorber layer 23a and high-value resistor layer 34a, are located exactly opposite one another on the two sides of the carrier foil. In the embodiment shown, the high-value resistor layers have a meander shape. The various resistor layers are connected via connecting lines 35, 36, which are only provided individually with reference numbers for resistor layer 34b, to inner terminal areas 37 and 38, which communicate with further outer terminal areas 39 and 40. Such a formation as can be found in particular in FIGS. 3 and 4 is provided not only for the radiation measuring device exposed to the radiation but also for a reference measuring device provided in the measuring system which is not exposed to any radiation but is instead shielded against the radiation to be measured.

Figure 7:
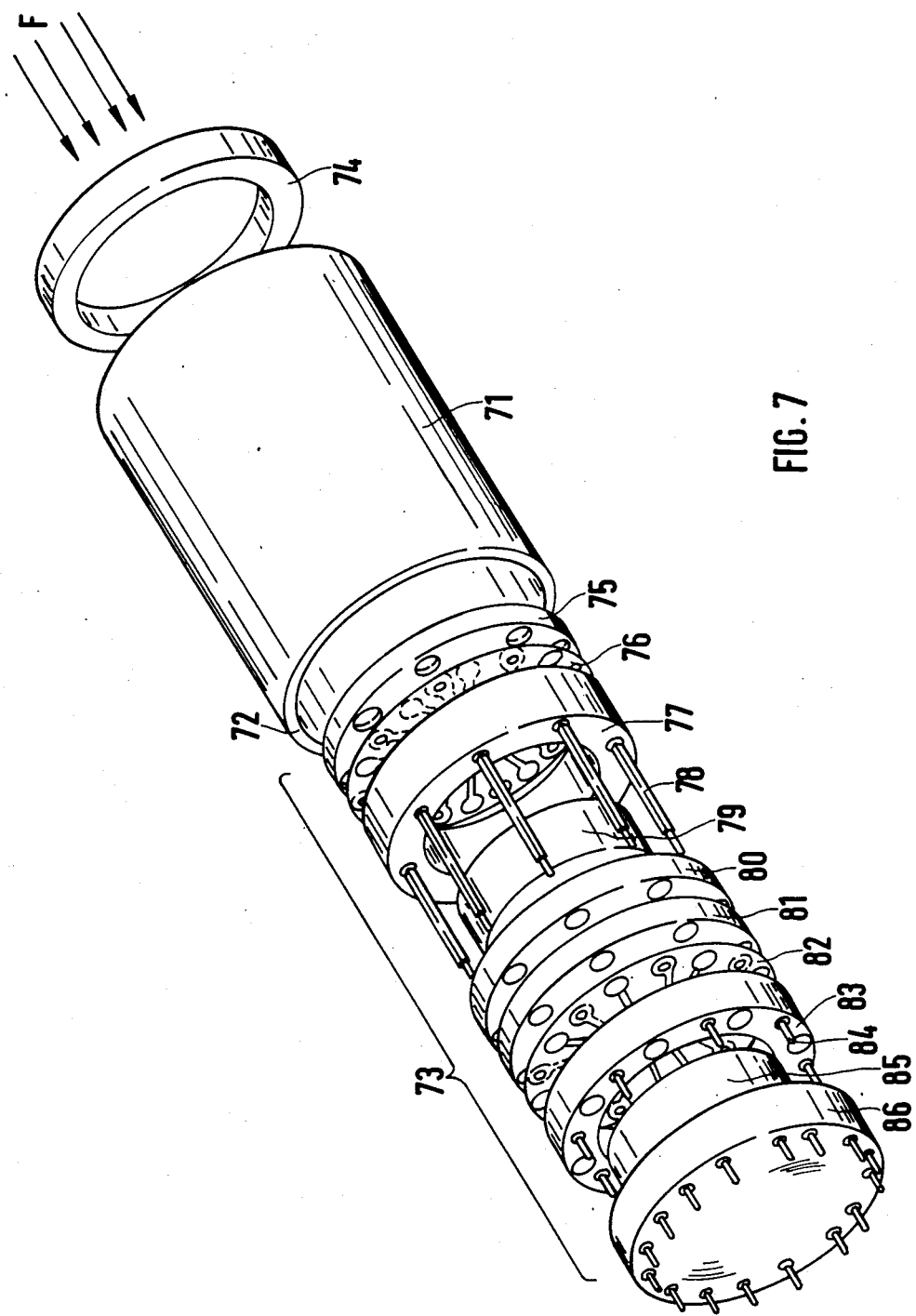
FIG. 7 is a perspective exploded view of a preferred embodiment of a measuring system according to the invention.

The radiation measuring device exposed to the radiation and the reference device shielded against the radiation are arranged one behind the other in a single housing embodiment shown in FIG. 7.

The resistor layer(s) of the reference measuring device are electrically switched into the Wheatstone bridge 6 of FIG. 2 and correspond to the resistor 9.

FIG. 5 shows a dissipator 41 which is adapted to be placed on the carrier foil shown in FIG. 3 with the thermal layers 22a, 22b, 22c and 22d applied and the absorber layers 23a, 23b, 23c and 23d placed thereon. The dissipator has recesses 42a, 42b, 42c and 42d which have windows 43a, 43b, 43c and 43d on their top surfaces.

The arrangement described above is shown clearly in the cross-sectional view of FIG. 6. FIG. 6 shows the dissipator 41 with the recesses 42a, 42b, 42c and 42d in the top surfaces of which, 54a, 54b, 54c and 54d, there are windows 43a, 43b, 43c and 43d whose dimensions are identical to the dimensions of absorber layers 23a, 23b, 23c and 23d, as can be clearly seen in the view depicted in FIG. 3.

FIG. 7 shows a perspective exploded view of an embodiment of a measuring system having the inventive radiation measuring device and a reference measuring device. A cylindrical housing 71 is provided at one end with an inner collar 72. The arrangement referred to as 73 is supported on the inner collar 72 when the arrangement is mounted into the cylindrical housing 71 from the right as viewed in FIG. 7. It is secured with the help of a ring nut 74 which is screwed into a corresponding inside thread at the other end, which is shown on the right when viewing FIG. 7, of the cylindrical housing 71.

Reference character 75 refers to the dissipator 41 just described in connection with FIGS. 5 and 6. The dissipator 41 has a corresponding wall thickness, the corresponding recesses as well as the corresponding windows recited above. Reference character 76 refers to the view of the radiation measuring device exposed to the radiation, consisting of a carrier foil and thermally conductive layers and absorber layers placed thereon facing in the direction of irradiation (arrow F). A base 77 follows, which is made of an insulating material and into which the contact pins 78 are mounted. The contact pins 78 protrude through the base 77 end face on the side facing the radiation measuring device 76 as contact surfaces which can easily be connected to the contact surfaces on the radiation measuring device 76. The bottom of the carrier foil, i.e. the side carrying the resistor layers, is also in contact with a dissipator, i.e. a cylindrical body made of aluminum, which is provided, however, with recesses such that it does not short-circuit the various connections and resistor layers. This dissipator is referred to in the drawing by reference character 79.

An uninterrupted dividing disk 80, for example an aluminum disk, is mounted next to the base 77. The dividing disk 80 completely shields or isolates the measuring portion of the system (the radiation measuring device) against the reference portion (the reference measuring device). Reference character 81 refers to a dissipator which corresponds to the dissipator 75 in every respect. Reference character 82 refers to a reference measuring device which corresponds to the radiation measuring device 76 in every respect. A base 83 then follows, which essentially corresponds to the base 77 and carries contact pins 84 corresponding to the contact pins 78. These contact pins 84 are staggered with respect to the contact pins 78 in such a way that they are located centrally between the contact pins 78. A dissipator 85 is also provided again here, corresponding essentially to the dissipator 79. Both types of contact pins 78 and 84 are insertable into apertures provided in a common base 86, which is an insulating body similar to bases 77 and 83.

The terminal areas shown on the reference measuring device 82 are bored out on the side of the carrier foil carrying the resistor layers, through which the contact pins 78 protrude, so that there is no contact between the reference bolometer and the measuring bolometer proper, which is exposed to the radiation. Instead, the corresponding row of contacts protrudes beyond the base 83 and is expediently inserted in a common end base bearing a corresponding number of contacts.

By arranging the radiation measuring and reference measuring devices in such a way that the contacts are staggered with respect to each other, and by switching into a Wheatstone bridge, compensation of the magnetic fields which differ in time is achieved. The selected incorporation of the reference measuring device further allows for complete compensation of non-measurable portions of radiation z.B. neutrons, γ-radiation which only heat the housing and the parts of the measuring system communicating therewith without the measurement being affected.

Figure 8:
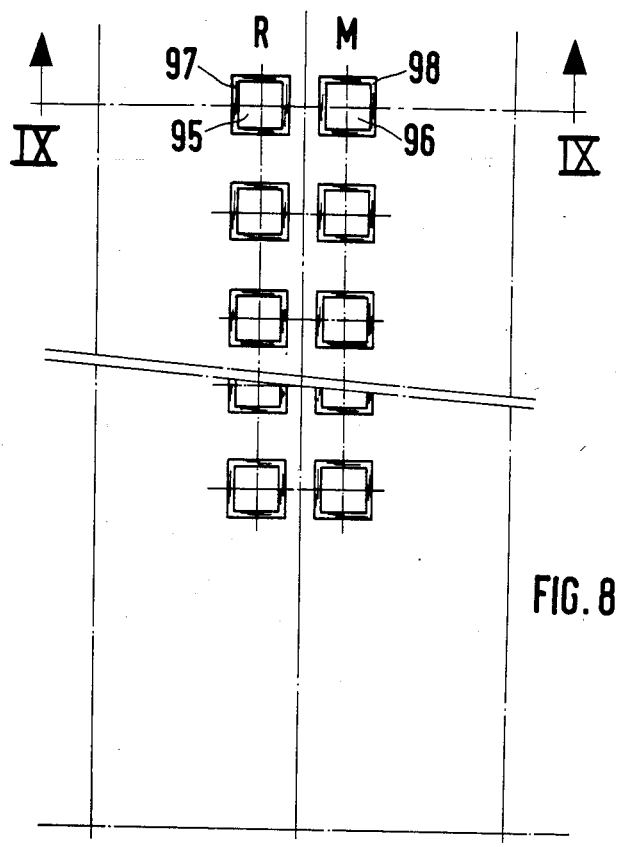
FIG. 8 is a partial top view of a modified embodiment of a radiation measuring system in which the radiation measuring and reference measuring devices are arranged side-by-side in repetitive patterns.

In the embodiment as shown in FIG. 8, the radiation measuring and reference measuring devices are arranged side by side and several such pairs of devices, one behind the other, in one row each are illustrated. The radiation measuring devices should be located in the right-hand row M, while the reference measuring devices may be found in the left-hand row R.

Figure 9:
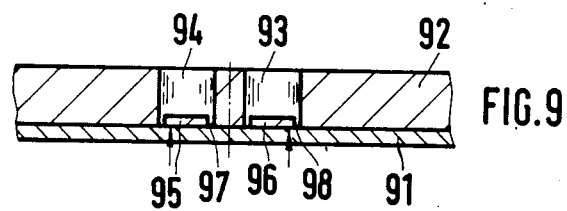
FIG. 9 is a cross-section along line IX—IX of FIG. 8, the high-value resistor layers provided on the bottom of the carrier foil not being shown because of the difficulty of showing cross-sections of such extremely thin layers.

FIG. 9 illustrates the construction in cross-section. On the carrier foil 91 is deposited a gold layer 92 by way of vacuum metallizing to form the dissipator. It has a thickness, for example, of 25 μm. In the layer 92 are formed recesses 93 and 94 which each have a bottom whose central area 95 and 96, respectively, forms an absorber layer which is, for example, 4 μm thick and passes directly into the dissipator layer 92 via an edge area 97 and 98, respectively (see also FIG. 8), which has a correspondingly smaller thickness of only 0.5 μm, for example, and forms the thermally conductive layer. The absorber layer, the thermally conductive layer and the dissipator are thus fonmed of one piece. The production of such a formation by the vacuum metallizing or etching method does not involve any difficulties.

In the embodiment shown in FIGS. 8 and 9 the covering of the thermally conductive layer and the dissipator is realized by a cover made of appropriate material which limits the irradiation to the absorber layer of the radiation measuring device by means of windows. For the reference measuring devices, the absorber layer is of course also shielded against the impinging radiation by this cover. The cover is not shown in FIG. 9.

The windows limiting the irradiation to the desired absorber layers may also be realized by protruding edges on the corresponding recesses 93, but this design is difficult as well as elaborate.

Figure 10:
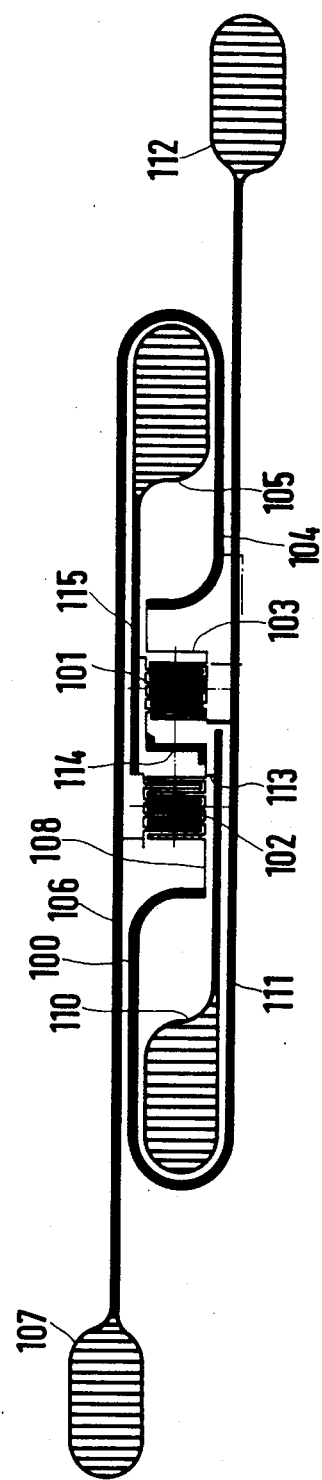
FIG. 10 is a top view of a pair of high-value resistor layers such as are assigned to the corresponding pairs of the measuring and reference absorber layers of the measuring system as in FIGS. 8 and 9, with their respective connecting lines and terminals.

FIG. 10 shows a pair of high-value resistor layers being a part of a pair consisting of a radiation measuring device and a reference measuring device. These high-value resistor layers are provided on the side facing away from the radiation measuring and reference measuring device side, precisely adapted to the positions of the radiation measuring and reference measuring devices. Arrangements 101 and 102 do not only include the resistor winding belonging to the particular measuring resistor M (see resistor 4 as in FIG. 2) and the particular reference resistor R (see resistor 9 as in FIG. 2), which are each designed here in the shape of a flat convolution, but also each winding located opposite in the measuring bridge and also designed as a convolute pattern (see resistors 8 and 7 as in FIG. 2). Such convolutions can be intertwined or banked, as can be seen in FIG. 10, resulting in a flat formation including both resistors. The junctions can be directed out of these flat formations 101 and 102 in such a way that there is no overlapping anywhere, which substantially facilitates the production of the arrangement.

From the end 103 of one of the convolute-like resistors of the formation 101, a connecting line leads to a lead 104 which is directed around a terminal area 105 and then to an outer lead 106, connected to an outer terminal area 107. From the formation 102 a connecting line 108 is directed to a lead 100 which is directed around a terminal area 110 and then to another outer lead 111 which is, in turn, connected to the other outer terminal area 112. The resistor of the formation 101 located at one end at the connecting line is located at the other end at the outer lead 111. The resistor of the fonmation 102 located on one end at the connecting line 108 is located at the other end both at an inner lead 113, which leads to the terminal area 110, and at a connecting element 114 which is also connected to the second resistor in the formation 101, which is connected at its other end to the lead 115 which leads to the inner terminal area 105. Furthermore, one end of the second resistor is connected to the lead 115, this resistor being located at its other end at the outer lead 106. If one follows the various connections, the overall arrangement results in the bridge circuit as shown in FIG. 2, whereby here the measuring resistor and opposite resistor 8, and reference resistor 9 and opposite resistor 7, are each located within the boundary of a predetermined field, opposite which the respective absorber layers of the radiation measuring and reference measuring devices are located on the other side of the carrier foil.

Figure 11:
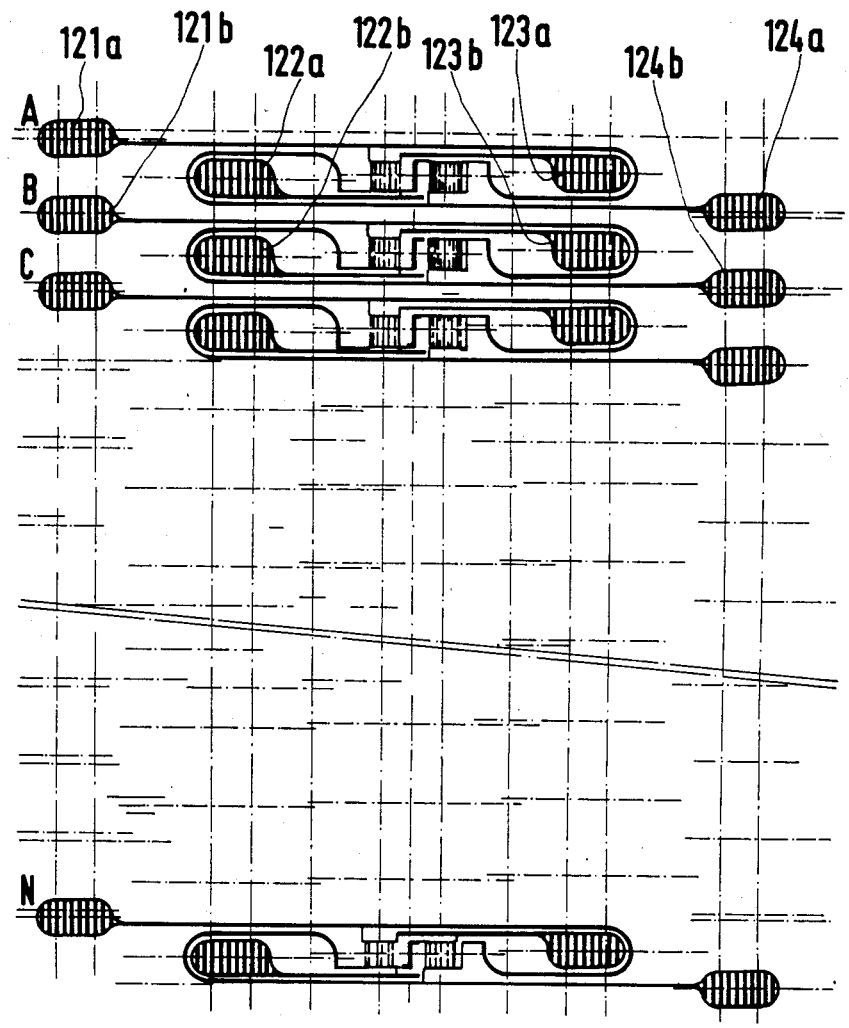
FIG. 11 is a top view of a plurality of pairs of high-value resistor layers for the arrangement of the measuring and reference absorber layers shown in FIG. 8.

FIG. 11 shows the multiple arrangement of such circuits shown in detail in FIG. 10. So that adjacent circuits A, B, C . . . N do not interfere with each other electrically, the terminal areas 121a and 122a of circuit A are applied to the alternating voltage supply of the bridge circuit, while the connection of the remaining two terminal areas 123a and 124a forms the neutral arm. In the case of the next circuit B, the connections are reversed, i.e. the neutral arm is located between terminal areas 121b and 122b, while the supply anm is located between the terminal areas 123b and 124b. In the case of circuit C, the connecting conditions are again as in circuit A, etc. The neutral arms and supply arms are thus always located side by side, respectively, so that the low voltages of the neutral arms, and high voltages of the supply arms, can at most always affect each other, respectively, and the high voltage applied to a supply arm is not picked up in the low voltage applied to a neutral arm. It is thus assured that the outer leads 106 and 111, as shown in FIG. 10, of adjacent circuits always conduct equal potentials.

The mode of operation of a device according to the invention shall be explained in more detail with reference to FIGS. 12 and 15.

Figure 12:
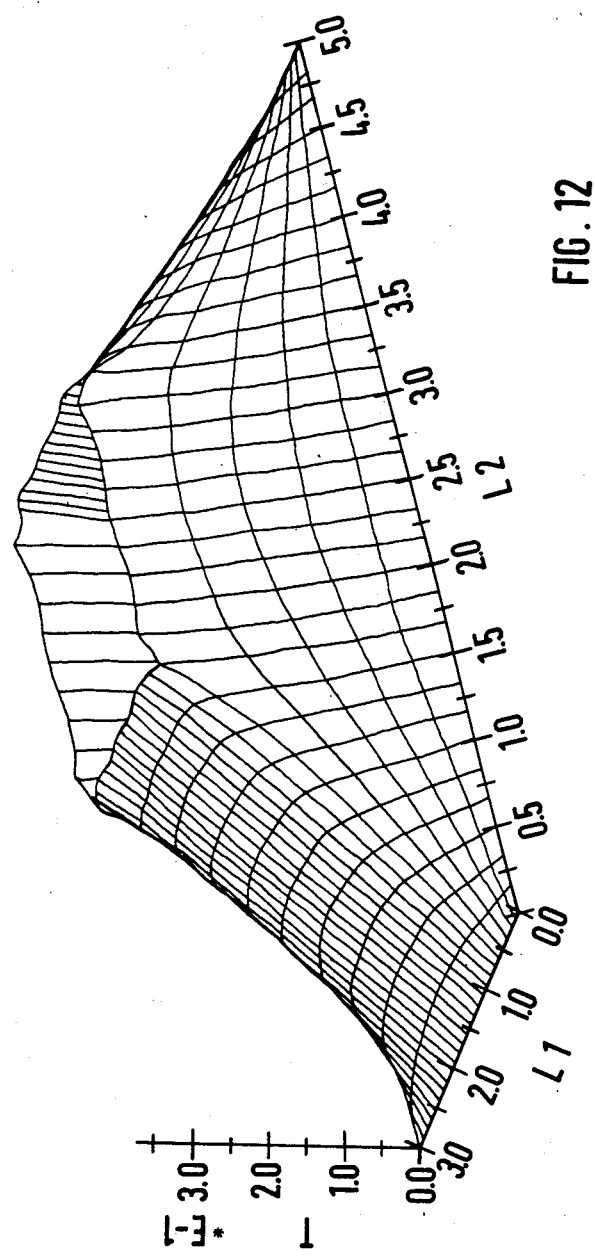
FIG. 12 is a schematic view of the temperature distribution from the absorber layer via the thermally conductive layer to the dissipator.

FIG. 12 shows a three-dimensional temperature pattern from the highest temperature prevailing on the absorber layer (at the top) to the dissipator (ambient temperature) for a point of time T.

The absorber layer is exposed to the radiation to be measured. The radiation absorbed in the absorber layer leads to the absorber layer being heated. The heat dissipates in the direction of the high-value resistor layer and to the sides. The high-value resistor layer changes its resistance value measurably; the higher its value, the more apparent the change. The continuous impinging radiation leads to the absorber layer being heated continuously until the heat dissipated is equal to the absorbed radiated power. The heat is transported off by the large-mass dissipator with a high heat capacity and high thermal conductivity with negligible heating effect. The change in the resistance of the resistor layer on the side of the carrier foil opposite the absorber layer is a measure of the temperature change averaged over the surface of the resistor or absorber layer.

It can be shown that the temperature change of the detector is a function of power $P_o$ in an approximate manner by an exponential function of the following form:

$$> \tau_o(t) > = P_o \tau_{eff}/c_{eff}(1 - e^{-t/\tau_{eff}}) \qquad (1)$$

The constant $\tau_{eff}$ and $c_{eff}$ are called bolometer constants.

However, the approximation is valid only when the time for the temperature to reach a steady state in the direction of the resistor layer is substantially faster than the heat transport towards the sides. The time constant $\tau_{effxy}$ of the thermal conduction in X and Y direction must thus be substantially greater than the time constant $\tau_{eff_z}$ holding in the Z direction. The reason for this may be made clear upon viewing the two diagrams which are shown in FIGS. 13 and 14.

Figure 13:
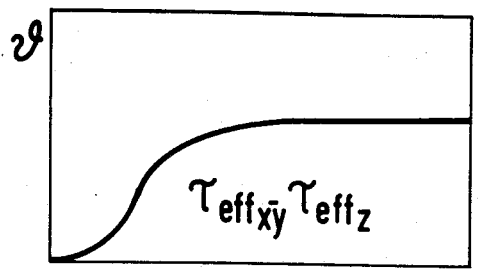
FIG. 13 is a graphic representation of the temperature pattern in time in the resistor layer with approximately identical time constants in the X, Y direction and the Z direction.
Figure 14:
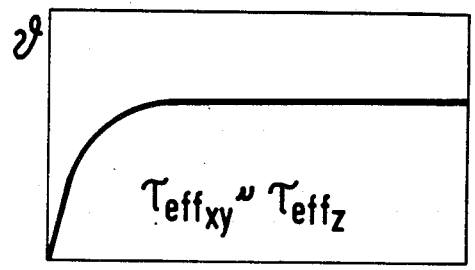
FIG. 14 is a view similar to that in FIG. 13, but for a substantially larger time constant in the X, Y direction.

FIG. 13 illustrates graphically the difficult description of the resulting thenmal processes when deriving the impinging power from the temperature change and the resulting measurable resistance change of the bolometer resistor, while FIG. 14 illustrates the radiated power P(t) which may be derived as follows:

$$P(t) = C_{eff}\left(\frac{d<\theta(t)>}{dt} + \frac{<\theta(t)>}{\tau_{eff}}\right) \quad (2)$$

It is, therefore, essential to design the bolometer detector structurally in such a way that the heat flow from the absorber side through the thin carrier foil to the resistor layer takes place in a much shorter time than the lateral dissipation of heat from the absorber layer to the dissipator. It is imperative that the measuring bolometer facing the radiation source is completely covered by an electrically conductive and thermally conductive layer, in order to avoid charging by secondary electrons and achieve defined heat transporting conditions to the dissipator and defined characteristic data.

The dissipation of heat may be affected structurally by enlarging or reducing the thickness of the absorber layer, as well as by enlarging or reducing its length and/or width.

With a given thickness, a corresponding enlargement of the length and/or width results in an enlargement of the time constant. A reduction of thickness would require a reduction of the lateral dimensions with an equal time constant. However, the selection of the time constant is not infinite since this would lead to greater heating of the detector, on the one hand, and not to any exploitable increase in the sensitivity of the bolometer, on the other hand. The diagram in FIG. 15 graphically represents this state of affairs.

Figure 15:
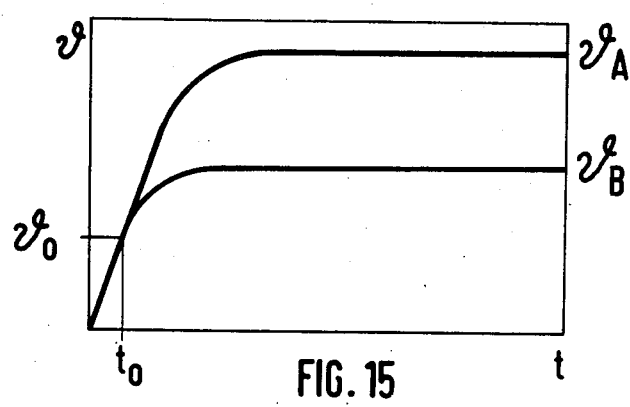
FIG. 15 is a view similar to that in FIG. 14, but for two different time constants in the X, Y direction.

With reference to FIG. 15, it can be seen that for the short time to the temperature difference $\theta_o$ of the absorber layer, for the detector with a large time constant (B), to that with a small time constant (A) is virtually identical. However, for long time periods t the temperature change $\theta_A$ is smaller than in case (B). The higher sensitivity can thus only be exploited for longer time periods, although it suffices when the signal/noise ratio has approximately the value 1000. Furthermore, a further increase in the time constant leads to a restriction of the dynamics with respect to the radiated power to be measured and the inherent radiation of the absorber layer is no longer completely negligible due to the higher detector temperature.

Reference must be made to a particularly advantageous possibility of using the inventive measuring system in connection with FIG. 2.

If a push-pull alternating voltage is selected as the voltage U, an alternating voltage staggered by 180° with respect to the lower voltage connection is applied to the upper voltage connection. This means that the neutral arm always has a voltage level of zero when the bridge is balanced. This results in the possibility of measuring against the zero level, so that measuring signals are obtained which can be considerably amplified because there is no offset whatsoever. Since the influence of stray capacitances of cables etc. is thus minimized, the balancing of the bridge is considerably simplified and microfony effects are neglectable. A further advantage results from the fact that an evaluation according to log-in technology can take place due to the use of alternating voltage supply for the Wheatstone bridge.

We claim:

1. A radiation measuring device comprising:
   an electrically insulative carrier foil having a first surface and an opposite surface;
   an absorber layer having a preselected sized and shape disposed on said first surface of said carrier foil, said absorber layer being heated by the absorption of incident radiation to be measured;
   a high-value resistor layer operative to be heated by said abosorber layer, said high-value resistor layer being disposed on said opposite surface of said carrier foil proximate said absorber layer;
   a thermally conductive layer interposed said absorber layer and said carrier foil having portions laterally protruding from said abosorber layer along said first surface of said carrier foil; and
   means for dissipating heat in thermally conductive contact with said laterally protruding portions of said thermally conductive layer such that the heat to be dissipated from said absorber layer is conducted by said thermally conductive layer to said means for dissipating heat, said means for dissipating heat further comprising means for shielding said thermally conductive layer from said incident radiation.

2. The radiation measuring device as claimed in claim 1, wherein said absorber layer is made of a precious metal.

3. The radiation measuring device as claimed in claim 1 or 2, wherein said thermally conductive layer is made of the same material as said absorber layer.

4. The radiation measuring device as claimed in claim 2 wherein said precious metal is gold.

5. The readiation measuring device as claimed in claim 1, wherein said thermally layer comprises a plurality of thermally conductive layers and wherein further said absorber layer comprises a plurality of absorber layers, each of said plurality of absorber layers being mounted to a respective one of said plurality of thermally conductive layers, each of said plurality of thermally conductive layers bearing said absorbers layers further being arranged side by side in spaced rows.

6. The radiation measuring device as claimed in claim 1, wherein said thermally conductive layer said absorber layer are of one piece construction with said abosorber layer and thermally conductive layer being of the same material.

7. The radiation measuring device as claimed in claim 1, wherein said means for dissipating heat further comprises a window in said means for shielding exposing only said absorber layer to said incident radiation.

8. The radiation measuring device as claimed in claim 7, further comprising a fixed resistor located opposite said high-value resistor layer in said measuring bridge, said fixed resistor being a high-value resistor layer and further being arranged together with said high-value resistor layer on said opposite surface of said carrier foil facing away from said absorber layer within a boundary corresponding to the boundary of said absorber layer.

9. The radiation measuring device as claimed in claim 8, further comprising a plurality of solderable terminal areas, said plurality of solderable terminal areas being arranged such as to surround said resistor layers on said opposite surface of said carrier foil.

10. The radiation device as claimed in claim 11 wherein said means for dissipating heat further comprises:

a disk member made of a material exhibiting good thermal conductivity, said disk member contacting said thermally conductive layer, said disk member further having a predetermined thickness substantially greater than the thickness of said absorber and thermally conductive layers, said disk member further having at least one recess having lateral limits spaced a predetemrined distance from the circumferential limits of said absorber layer and a top surface having at least one window whose dimensions correspond to those of said absorber layer.

11. The radiation measuring device as claimed in claim 10, wherein said disk member and thermally conductive layer are a single member and made of the same material.

12. The radiation measuring device as claimed in claim 1, wherein said means for disspating heat and thermally conductive layer comprises a dissipator coating deposited on said carrier foil, said dissipator coating comprising at least one recess, said at least one recess having a bottom whose central area forms said absorbent layer, a thin peripheral edge area surrounding said absorber layer to form said thermally conductive layer, said material of the coating as a whole forming a dissipator for heat.

13. The radiation measuring devicd as claimed in claim 12, further comprising a masking body having at least one window whose dimensions correspond to said size and shape of said absorber layer such that when said masking body is placed on said dissipator coating said thin peripheral edge area is shielded from said radiation to be measured.

14. The radiation measuring device as claimed in claim 12 further comprising at least another recess spaced a predetermined distance from said at least one recess, said predetermined distance being selected such that the heat transmission between said absorber layer and said high-value resistor layer takes place at a preselected rate substantially faster than the heat transmission from said absorber layer into said dissipator coating.

15. The radiation measuring device as claimed in claim 14, wherein said thin peripheral edge area representing the distance between the central area forming said absorber layer and said dissipator coating has a predetermined thickness, the thickness of the thermally conductive layer being adjustable such that the time constant of lateral thermal head trasnport from said absorber layer to said dissipator coating is adjustable.

16. The radiation measuring device as claimed in claim 1, wherein said high-value resistor layers mounted to said electrically insulative carrier foil proximate said absorber layer is connected in a separate resistance bridge of a Wheatstone bridge arrangement.

17. A radiation measuring system having a radiation measuring device ior measuring incident radiation and a reference measuring device, wherein each of said radiation measuring and reference measuring devices comprises:

at least one electrically insulative carrier foil having a first surface and an opposite surface;

at least one absorber layer operative to be heated by said incident radiation disposed on said first of said carrier foil, said at least one absorber layer having a preselected size and shape;

at least one high-value resistor layer operative to be heated by said at least one absorber layer disposed on said opposite surface of said at least one carrier foil proximate said at least one absorber layer;

at least one thermally conductive layer disposed on said first surface between said at least one absorber layer and said at least one carrier foil, said at least one thermally conductive layer having portions laterally protruding from said at least one absorber layer along said first surface of said carrier foil; and means for dissipating heat in thermally conductive contact with said laterally protruding portions of said at least one thermally conductive layer such that the heat to be dissipated from said at least one absorber layer is conducted by said at least one thermally conductive layer to said means for dissipating heat, said means for dissiapting heat further comprising means for shielding said at least one thermally conductive layer from said radiation to be measured;

wherein said radiation measuring system further comprises:

a housing providing a common support for said radiation measuring and reference measuring devices; and means disposed in said housing for shielding said at least one absorber layer of said reference measuring device from said incident radiation.

18. The measuring system as claimed in claim 17, wherein said radiation measuring device and said reference measuring device are disposed one behind the other in said housing.

19. The measuring system as claimed in claim 17 wherein each of said radiation measuring and reference measuring devices further comprise:

at least two inner terminals disposed on said opposite surface of said carrier foil electrically connected to opposite ends of said at least one high-value resistor layer; and at least two ouer terminals, each spaced a predetermined circumferential distance from a respective one of said at least two inner terminals and electrically connected to said respective one of said at least two inner terminals, each of said at least two outer terminals of said reference measuring device having an aperture passing therethrough;

wherein said measuring system further comprises:

a base member mounted in said housing between said radiation measuring and reference measuring devices, said base member having at least one first contact pin conductively connected to one of said at least two outer terminals of said radiation measuring device; and at least one second contact pin conductively connected to one of said at least two inner terminal of said reference measuring device, said at least one first contact pin passes through said aperture of one of said at least two outer terminals of said reference measuring device to electrically contact one of said at least two outer terminals of said radiation measuring device whereby said base member and said at least one first and second contact pins constitute a connecting plug body for the measuring system.

20. The measuring system as claimed in claim 19 further comprising at least one dissipator connecting said radiation measuring device and said reference measuring device.

21. The measuring system as claimed in claim 19, further comprising a base socket connected to said reference measuring device and further being the connecting body for said reference measuring and radiation measuring devices.

22. The measuring system as claimed in claim 21, wherein said first and said second contact pins protrude from said base member to provide a connection between said reference measuring and radiation measuring devices.

23. The measuring system as claimed in claim 17, wherein said radiation measuring device and said reference measuring device are arranged side-by-side on said carrier foil, said reference measuring device being shielded from the incident radiation.

24. The measuring system as claimed in claim 23, wherein said at least one high-value resistor layer of said reference measuring device are two intertwined high-value resistor layers and wherein each of said two inertwined high-value resistor layers has two leads connected to terminal aras provided on each side of said side-by-side arrangement of said radiation measuring and reference measuring devices, the outer of said two leads winding around the terminal areas of the inner of said two leads, one of said two interwindd high-value resistor layers being connected between the outer leads of said radiation measuring and reference measuring devices and the otehr of said two intertwined high-value resistor layers being connected between the inner leads of said radiation measuring and reference measuring devices, while the two intertwined high-value resistor layers of the other of said radiation measuring and reference measuring devices are each connected between an outer and an inner lead.

25. The measuring system as claimed in claim 24, wherein there is a plurality of side-by-side radiation measuring and reference measuring devices, the recited arrangement of the connections of said intertwined high-value resistor layers is repeated for each side-by-side arrangement of said radiation measuring and reference measuring devices in a symmetrical arrangement on said carrier foil.

26. The measuring system as claimed in claim 25, wherein the outer leads of adjacent circuits conduct equal potentials.

27. A radiation measuring device comprising:
an electrically insulative carrier foil having a first surface and an opposite surface;
a plurality of absorber elements having preselected sizes and shapes disposed on said first surface of said carrier foil, said absorber elements, being heated by the abosorption of incident radiation to be measured;
a plurality of high-value resistor elements operative to be heated by said absorber elements disposed on said opposite surface of said carrier foil, each of said high-value resistor elements being disposed proximate a respective one of said plurality of absorber elements;
a plurality of thermally conductive elements, each of said thermally conductive elements being disposed on said first surface between a respective one of said plurality of absorber elements and said carrier foil, each of said plurality of thermally conductive elements having a predetermined portion laterally protruding from each respective one of said plurality of absorber elements; and
means for dissipating heat in thermally conductive contact with said laterally protruding predetermined portion of each of said plurality of thermally conductive elements such that the heat to be dissipated from each of said plurality of absorber elements is conducted by said respective one of each of said plurality of thermally conductive elements.

28. The radiation measuring device as claimed in claim 27, wherein said plurality of high-value resistor elements disposed on said carrier foil proximate said plurality of absorber elements are connected in a separate resistance measuring bridge of a Wheatstone bridge arrangement.

29. The radiation measuring device as claimed in claim 27, wherein at least some of the plurality of high-value resistor elements disposed proximate a respective one of said plurality of absorber elements are connected in series and are connected in a separate resistance measuring bridge of a Wheatstone bridge arrangement.

30. The radiation measuring device as claimed in claim 27 wherein said plurality of thermally conductive elements are connected to each other via said means for dissipating heat.

* * * * *

UNITED STATES PATENT AND TRADEMARK OFFICE
CERTIFICATE OF CORRECTION

PATENT NO. : 4,687,342

DATED : August 18, 1987

INVENTOR(S) : Betzler et al

It is certified that error appears in the above-identified patent and that said Letters Patent is hereby corrected as shown below:

Column 1, line 49, before "magnitude" insert ---- the ----.

Column 3, line 22, delete "fonmerly" and insert ---- formerly ----.

Column 5, line 6, after "housing" insert a period ---- . ----.

Column 5, line 55, delete "thenmally" and insert ---- thermally ----.

Column 6, line 61, delete "fonm" and insert ---- form ----.

Column 9, line 13, delete "fonmed" and insert ---- formed ----.

UNITED STATES PATENT AND TRADEMARK OFFICE
CERTIFICATE OF CORRECTION

PATENT NO. : 4,687,342

DATED : August 18, 1987

INVENTOR(S) : Betzler et al

It is certified that error appears in the above-identified patent and that said Letters Patent is hereby corrected as shown below:

Column 10, line 19, delete "anm" and insert ---- arm ----.

Column 11, line 5, delete "thenmal" and insert ---- thermal ----.

In the Claims

Column 12, line 38, delete "readiation" and insert ---- radiation ----.

Column 12, line 39, after "thermally" insert ---- conductive ----.

Column 13, line 1, after "radiation" insert ---- measuring ----, same line, delete "11" and insert ---- 1 ----.

UNITED STATES PATENT AND TRADEMARK OFFICE
CERTIFICATE OF CORRECTION

PATENT NO. : 4,687,342

DATED : August 18, 1987

INVENTOR(S) : Betzler et al

It is certified that error appears in the above-identified patent and that said Letters Patent is hereby corrected as shown below:

Column 13, line 31, delete "devicd" and insert ---- device ----.

Column 13, line 53, delete "head" and insert ---- heat ----, same line, delete "trasnport" and insert ---- transport ----.

Column 13, line 61, delete "ior" and insert ---- for ----.

Column 13, line 63, please delete paragraph indention.

Column 13, line 68, after "first" insert ---- surface ----.

Column 14, line 25, kindly add paragraph indention.

Column 14, line 43, delete "ouer" and insert ---- outer ----.

Column 14, line 51, kindly add paragraph indention.

UNITED STATES PATENT AND TRADEMARK OFFICE
CERTIFICATE OF CORRECTION

PATENT NO. : 4,687,342
DATED : August 18, 1987
INVENTOR(S) : Betzler et al

It is certified that error appears in the above-identified patent and that said Letters Patent is hereby corrected as shown below:

Column 14, line 58, delete "terminal" and insert ---- terminals ----.

Column 15, line 25, delete "aras" and insert ---- areas ----.

Column 15, line 30, delete "interwindd" and insert ---- intertwined ----.

Column 15, line 33, delete "otehr" and insert ---- other ----.

Column 16, line 32, after "elements" insert ---- , to said means for dissipating heat, said means for dissipating heat further comprising means for shielding each of said plurality of thermally conductive elements from said incident radiation ----.

Signed and Sealed this

Thirty-first Day of May, 1988

Attest:

DONALD J. QUIGG

Attesting Officer

Commissioner of Patents and Trademarks